US008615073B2

(12) United States Patent
Furumachi et al.

(10) Patent No.: US 8,615,073 B2
(45) Date of Patent: Dec. 24, 2013

(54) IMAGE DISPLAY APPARATUS, COMMUNICATIONS CONTROL METHOD OF THE SAME, AND COMMUNICATIONS CONTROL SYSTEM

(75) Inventors: Ryohei Furumachi, Saitama (JP); Shoichi Yokobori, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 201 days.

(21) Appl. No.: 13/218,018

(22) Filed: Aug. 25, 2011

(65) Prior Publication Data

US 2012/0162347 A1 Jun. 28, 2012

(30) Foreign Application Priority Data

Dec. 27, 2010 (JP) ................................. 2010-291133

(51) Int. Cl.
*H04M 11/00* (2006.01)
(52) U.S. Cl.
USPC ..................................... 379/93.21; 348/14.04
(58) Field of Classification Search
USPC .............. 348/14.04, 14.08, 14.12; 379/93.21, 379/158, 202.01
See application file for complete search history.

(56) References Cited

U.S. PATENT DOCUMENTS

| 7,564,476 | B1 * | 7/2009 | Coughlan et al. | 348/14.08 |
|---|---|---|---|---|
| 8,340,258 | B2 * | 12/2012 | Baker et al. | 379/93.21 |
| 8,374,324 | B2 * | 2/2013 | Suryanarayana et al. | 379/102.02 |
| 2008/0141294 | A1 * | 6/2008 | Leichter et al. | 725/28 |
| 2011/0292163 | A1 * | 12/2011 | Haltom et al. | 348/14.08 |

FOREIGN PATENT DOCUMENTS

| CN | 101902602 | 12/2010 |
|---|---|---|
| GB | 2463105 | 3/2010 |
| JP | 02-113761 | 4/1990 |
| JP | 2003-163739 | 6/2003 |
| JP | 2008-146449 | 6/2008 |
| JP | 2008-236636 | 10/2008 |
| KR | 20040013951 | 2/2004 |
| WO | WO 9827708 | 6/1998 |

OTHER PUBLICATIONS

Japanese Patent Application No. 2010-291133, Notice of Rejection, mailed Dec. 6, 2011, (with English Translation).
Japanese Patent Application No. 2010-291133, Notice of Rejection, mailed Mar. 6, 2012, (with English Translation).
European Application No. 11179474.9-2414, Extended European Search Report, mailed Mar. 30, 2012.

* cited by examiner

*Primary Examiner* — Olisa Anwah
(74) *Attorney, Agent, or Firm* — Blakely, Sokoloff, Taylor & Zafman LLP

(57) ABSTRACT

According to one embodiment, an image display apparatus includes a communication module, an acquisition module, an identification module, and a determination module. The communications module receives and transmits call information with communications equipment connected to the communications module through a network, the call information indicating information to communicate with the communications equipment. The acquisition module acquires environmental information representing an external environment of the image display apparatus. The identification module identifies personal information indicating a person existing in the environment or age information indicating an age of a person existing in the environment from the environmental information. The determination module determines, when the communications module receives the call information from the communications equipment, whether to permit the communications module to receive and transmit the call information with respect to the communications equipment that transmits the call information based on the identified personal information or the identified age information.

6 Claims, 15 Drawing Sheets

| USER'S AGE | 30 YEARS OR OLDER |
|---|---|
| TRANSMISSION PERMISSIBLE SETTING | any |
| INCOMING CALL REJECTION SETTING | xxxx0002 |
| INCOMING CALL DISPLAY SETTING | DISPLAY |

DETERMINATION BASIS IS AGE

| USER'S AGE | 12 YEARS OR YOUNGER |
|---|---|
| TRANSMISSION PERMISSIBLE SETTING | xxxx0001 |
| | xxxx0002 |
| INCOMING CALL REJECTION SETTING | - |
| INCOMING CALL DISPLAY SETTING | DISPLAY |

IMAGE DISPLAY APPARATUS, COMMUNICATIONS CONTROL METHOD OF THE SAME, AND COMMUNICATIONS CONTROL SYSTEM

CROSS-REFERENCE TO RELATED APPLICATIONS

This application is based upon and claims the benefit of priority from Japanese Patent Application No. 2010-291133, filed Dec. 27, 2010, the entire contents of which are incorporated herein by reference.

FIELD

Embodiments described herein relate generally to an image display apparatus, a communications control method of the image display apparatus, and a communications control system.

BACKGROUND

With the advance of network technology, various applications have been proposed for making a call between communications equipment connected to each other through a network.

Digital equipment tends to have high functionality with the development of highly-functional processing devices and software technology. Accordingly, a digital television display also tends to have various functions built therein. Such various functions enable the digital television display to acquire television program information from communications equipment connected to the digital television display through a network, for example. Furthermore, a function to make a call to another communications equipment connected through the network is proposed for the digital television display. To cause the digital television display to make a call to another communications equipment, incoming call control is needed.

For a telephone apparatus using a telephone communications line, various techniques have been proposed to carry out control according to a telephone caller upon arrival of an incoming call from the caller.

However, it is difficult to apply conventional control techniques used for telephone apparatuses to the digital television display because a number of people share the digital television display.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment of the invention, an image display apparatus comprises: a communication module; an acquisition module; an identification module; and a determination module. The communications module is configured to receive and transmit call information with communications equipment connected to the communications module through a network, the call information indicating information to communicate with the communications equipment. The acquisition module is configured to acquire environmental information representing an external environment of the image display apparatus. The identification module is configured to identify personal information indicating a person existing in the environment or age information indicating an age of a person existing in the environment from the environmental information. The determination module is configured to determine, when the communications module receives the call information from the communications equipment, whether to permit the communications module to receive and transmit the call information with respect to the communications equipment that transmits the call information based on the identified personal information or the identified age information.

Figure 1:
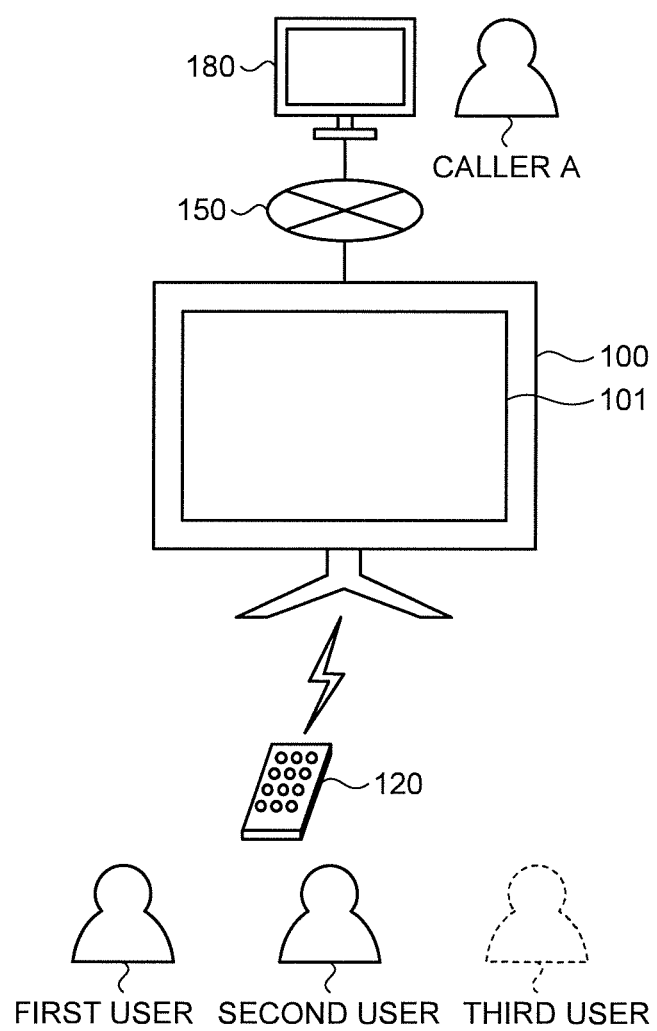
FIG. 1 is an exemplary schematic diagram illustrating an environment for the use of a television apparatus serving as an image display apparatus according to a first embodiment.

Embodiments are described below with reference to the accompanying drawings. FIG. 1 illustrates an environment for the use of an image display apparatus 100 according to a first embodiment. In the embodiment, the image display apparatus 100 is a digital television receiver. As illustrated in FIG. 1, the image display apparatus 100 has a function to display received program content on a display screen 101 as a digital television receiver. The image display apparatus 100 is connected to communications equipment 180 through a network 150.

The image display apparatus 100 further comprises a function capable of making a call to another communications equipment connected thereto through the network 150 by using a videophone, for example. This function enables the image display apparatus 100 to communicate with the communications equipment 180 by using videophone, for example. A remote controller 120 is used not only for selecting programs but also for making a call to another communications equipment.

In order to enable such communications to be carried out, an ID for making a call and the like is assigned to the image display apparatus 100. When the communications equipment 180 makes a call to the image display apparatus 100, the communications equipment 180 selects the ID for setting the image display apparatus 100 as a called party.

The image display apparatus 100 is shared by a plurality of persons. In the example illustrated in FIG. 1, a first user, a second user, and a third user share the image display apparatus 100. When a caller A who uses the communications equipment 180 wants to make a call to the third user, the caller A selects the ID identifying the image display apparatus 100 and makes a call to the image display apparatus 100. If the third user is absent, the first user or the second user is likely to receive a call from the caller A because the image display apparatus 100 is shared by the first, the second, and the third users. In order to address the case, the image display apparatus 100 according to the embodiment carries out control in such a manner that an incoming call for an intended user is not permitted to be received when the intended user is absent, for example. As a result, the image display apparatus 100 can carry out suitable control for users sharing the image display apparatus 100.

Figure 2:
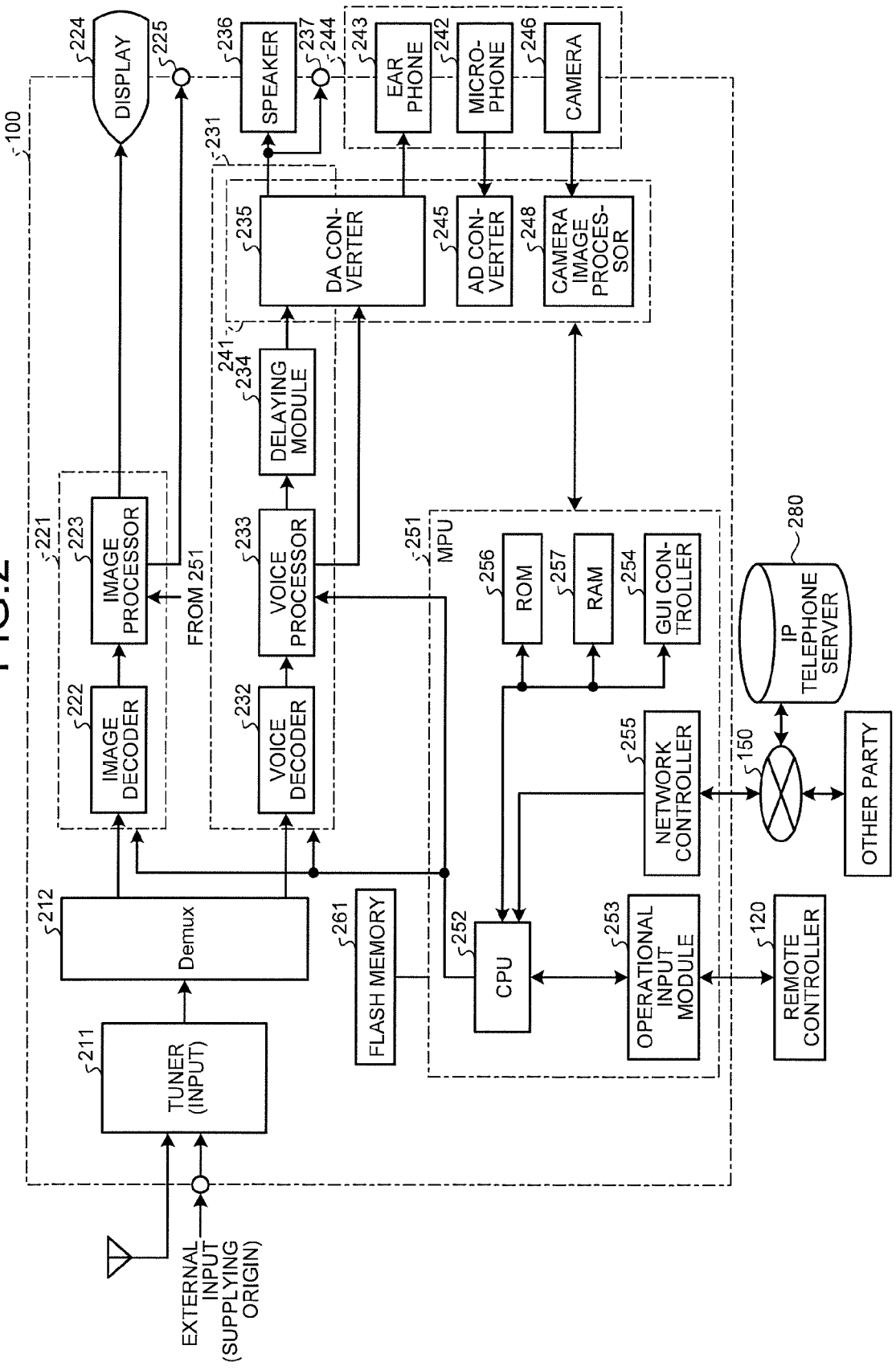
FIG. 2 is an exemplary schematic diagram of the image display apparatus and a communications device built into the image display apparatus, in the first embodiment.

FIG. 2 illustrates the image display apparatus 100 according to the embodiment and an example of a communications device built into the image display apparatus 100. Elements, structures, and functions described below may be realized by hardware or software by using a microcomputer (processing unit or central processing unit), for example.

The image display apparatus 100 illustrated in FIG. 2 comprises a digital television receiver that receives television broadcasting and reproduces voices (audio) and images (videos).

The image display apparatus 100 receives at least programs, i.e., contents, of digital broadcasting and reproduces the contents. The image display apparatus 100 can receive contents supplied through the network 150 (also referred to as an Internet communications line 150). The image display apparatus 100 can also use Internet protocol (IP) telephone that transmits and receives voices (audio) and moving images (videos) using the IP between itself and an arbitrary connected party connected through the Internet communications line 150. The image display apparatus 100 is connected to an IP telephone server 280 through the Internet communications line 150.

The image display apparatus 100 comprises a tuner 211 that receives contents (programs) through an antenna and a separator (Demux) 212 that separates the received contents into image data and voice (audio) data.

An image processing block 221 comprises an image decoder 222 and an image processor 223. The image decoder 222 decodes the image data separated by the separator 212 and outputs the decoded image data as a digital image signal.

The image processor 223 processes the image data output from the image decoder 222 so as to enable the image data to be displayed on a display 224 provided in a latter stage. The image processor 223 according to the embodiment converts image data into a predetermined resolution and an output form such as an interlaced form (i) or a non-interlace form (p). The image processor 223 then supplies the converted image data to the display 224. An output end 225 with which an external monitoring device, a projection device (projector) or the like can be connected may be selected as an output destination of the image processor 223.

On the other hand, the voice data separated by the separator 212 is input to a voice processing block 231. The voice processing block 231 comprises a voice decoder 232, a voice processor 233, a delaying module 234, and a digital-to-analog (DA) converter 235.

The voice decoder 232 decodes the input voice data and outputs the decoded data as a digital voice signal.

The voice signal decoded by the voice decoder 232 is input to the voice processor 233. The voice processor 233 processes the input voice signal so as to enable the input voice data to be reproduced by a voice output device, and outputs the processed signal to the delaying module 234. The delaying module 234 imparts a delay of a predetermined time duration to the input voice signal so as to provide temporal matching between the voice signal and the image signal output from the image processor 223. In other words, the delaying module 234 delays voice (audio) output. The delayed voice signal is input to the DA converter 235. The DA converter 235 produces analog voice (audio) output from the input voice signal.

The analog voice output from the DA converter 235 is input to a speaker 236, for example. The analog voice output from the DA converter 235 may branch so as to be input to an output end 237 with which an audio visual (AV) amplifier, for example, can be connected.

The voice (audio) signal to which the delaying module 234 has imparted the delay of the predetermined time duration can also be input to an IP telephone controller 241. The IP telephone controller 241 can be connected to a communications set 244. The communications set 244 comprises a microphone 242, ear phone 243, and a camera 246, for example. The communications set 244 may comprise a low-power speaker for voice reproduction as a voice reproducing module instead of the ear phone 243. The camera 246 images faces of users existing in an external environment of the image display apparatus 100.

The IP telephone controller 241 comprises an analog-to-digital (AD) converter 245, and a camera image processor 248, and shares the DA converter 235 that produces analog voice output with the voice (audio) processing block 231. The AD converter 245 converts an analog voice input from the microphone 242 into a voice (audio) signal. The camera image processor 248 processes a signal input from the camera 246 so as to produce image data.

A main control block 251 controls each of the tuner 211, the separator 212, the image processing block 221, the voice processing block 231 and the IP telephone controller 241 of the image display apparatus 100, and causes them to carry out their predetermined operation.

The main control block (referred to as a main processing unit and abbreviated as an MPU, hereinafter) 251 at least comprises a central processing unit (CPU) 252, a read only memory (ROM) 256, a random access memory (RAM) 257, a graphical user interface (GUI) controller 254, a network controller 255, and an operational input module 253.

The ROM 256 retains an operational program. The RAM 257 functions as a working memory. The GUI controller 254 processes operation to display a graphical user interface (GUI) on the display 224, and user input from the GUI.

The network controller 255 controls connection to the Internet communications line 150, i.e., controls acquisition of various pieces of information from the Internet communications line 150 and access from a user to the Internet communications line 150, for example. In the embodiment, the network controller 255 transmits and receives data with another communications equipment for communicating with each other by a videophone system.

The operational input module 253 is connected to the MPU 251. The operational input module 253 receives control input from a user. The operational input module 253 comprises channel keys (buttons) by which a channel selected by the tuner (input module) 211 is specified, and a power source switch used to turn on or off a power source. In addition, the operational input module 253 receives instructions and control input from the remote controller 120. Furthermore, the operational input module 253 may be connected to a key-operation input module (keyboard) that enables characters, symbols, numerals and the like to be input, for example.

The remote controller 120 comprises channel keys, a power source switch, and an operational key to start making a call using IP telephone. When operation is carried out by using the operational key, the operational input module 253 receives an instruction based on the operation, for example.

The CPU 252 reads out the operational program stored in the ROM 256, and thereafter carries out control according to the operational program by using the RAM 257 as a working region. The operational program comprises an IP telephone program. With the IP telephone program, the image display apparatus 100 makes a call to the communications equipment 180 through the Internet communications line 150 by using videophone, for example. The IP telephone program may comprise a function provided by a known program. For example, a function of the Internet telephone system "Skype (trade mark)" provided by Skype Technologies S. A. may be used.

With the execution of the IP telephone program by the CPU 252, a voice signal representing a user's voice collected through the microphone 242 of the communications set 244 is packetized and the packetized voice signal is transmitted to a communications party connected to the network (Internet communications line) 150. In addition, when the camera 246 is used, image data of a user imaged by the camera 246 is packetized and the packetized image data is transmitted together with the packetized voice signal.

With the execution of the IP telephone program by the CPU 252, when information is received from a communications party through the network controller 255, a voice signal and image data are separated from the information and decoded. The decoded voice signal is output to the voice processor 233. The voice signal processed by the voice processor 233 is output to the DA converter 235. As a result, the voice from the communications party is output from the speaker 236 or the ear phone 243.

On the other hand, the decoded image data is output to the image processor 223. The image processor 223 can reproduce decoded image data such as a still image typified as the joint photographic experts group (JPEG) format and a moving image typified as the moving picture experts group (MPEG)-2 or MPEG-4 (H.264/AVC). In this way, the image processor 223 processes not only reproducing operation of contents but also reproducing operation of image data transmitted by IP telephone.

A flash memory 261 is connected to the MPU 251. The flash memory 261 functions as a storage module that stores various data according to control from the MPU 251.

Figure 3:
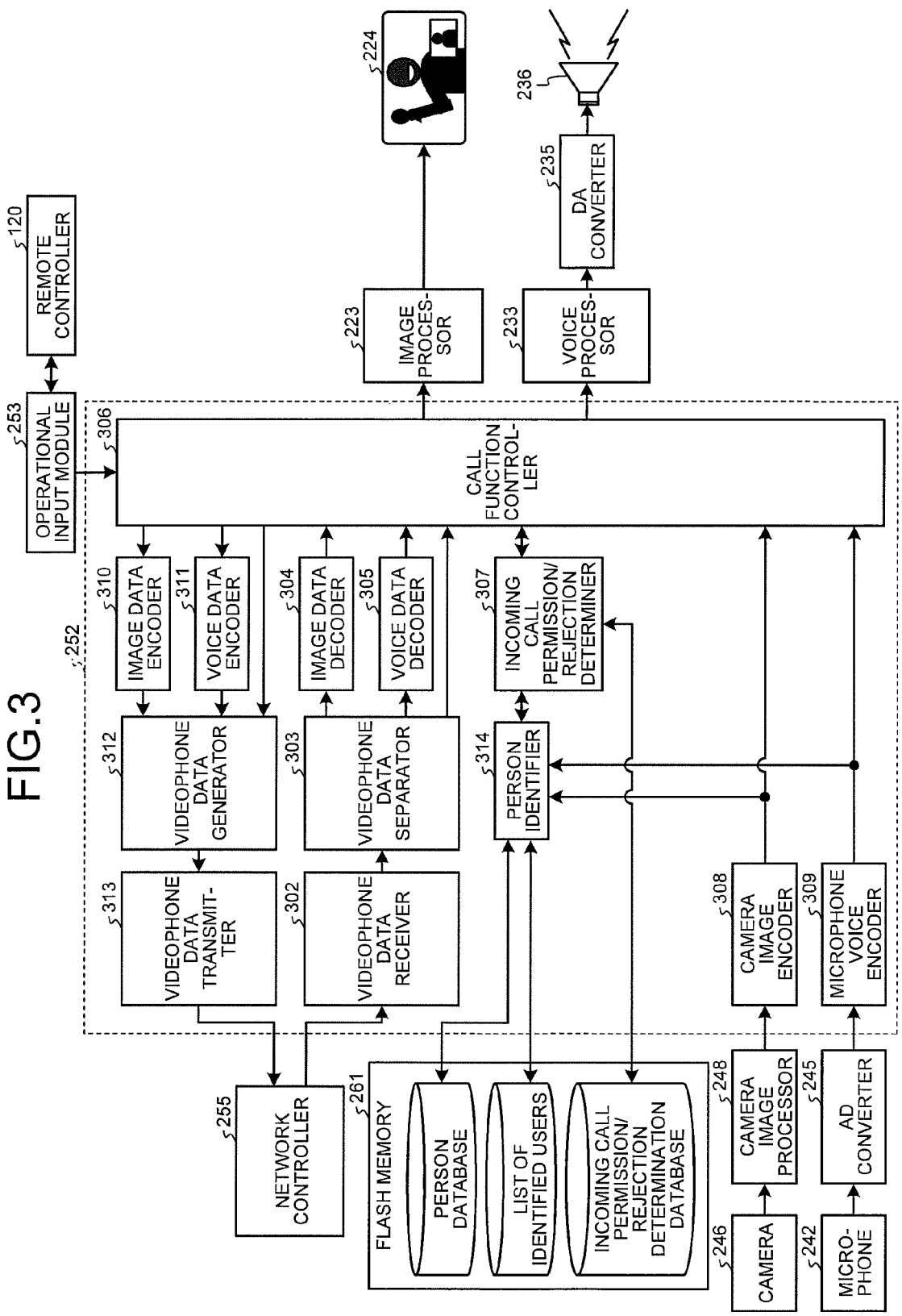
FIG. 3 is an exemplary block diagram illustrating a software function of an IP telephone program of the image display apparatus in the first embodiment.

The IP telephone program executed by the CPU 252 is described below. FIG. 3 is a block diagram illustrating a software function of the IP telephone program executed by the CPU 252. As illustrated in FIG. 3, the CPU 252 realizes the following functional structure when executing the IP telephone program: an image data encoder 310, a voice data encoder 311, a videophone data generator 312, a videophone data transmitter 313, a videophone data receiver 302, a videophone data separator 303, an image data decoder 304, a voice data decoder 305, a call function controller 306, an incoming call permission/rejection determiner 307, a person identifier 314, a camera image encoder 308, and a microphone voice encoder 309.

The image display apparatus 100 according to the embodiment having the above-described structure comprises a videophone function of making a call by using videophone, a function to identify users existing in a surrounding area of a television, a function to store, for each user, a permission/rejection setting of making a call between a user and a caller, and a function to determinate whether a user is permitted to make a call to a caller according to the call permission/rejection setting.

In the embodiment, when a call is being made between the image display apparatus 100 and the communications equipment 180 by using videophone, videophone data is being transmitted and received between the image display apparatus 100 and the communications equipment 180.

Figure 4:
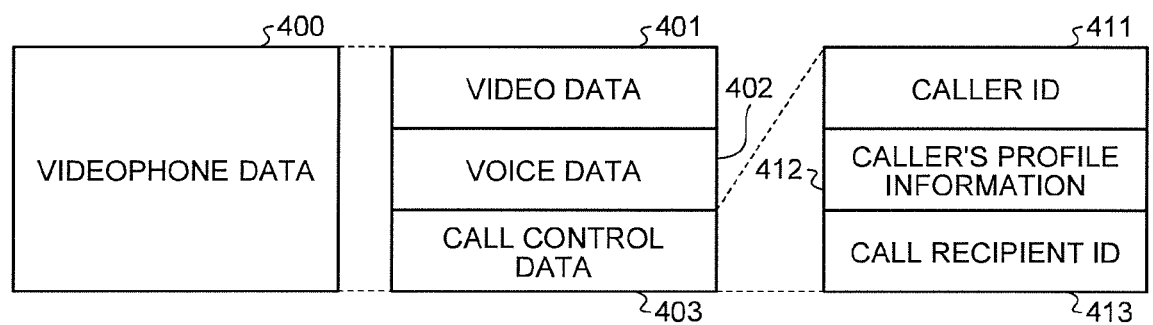
FIG. 4 is an exemplary schematic diagram illustrating a data structure of videophone data in the first embodiment.

FIG. 4 is a schematic diagram illustrating a data structure of videophone data. As illustrated in FIG. 4, videophone data 400 comprises voice data 401, voice data 402, and call control data 403. The voice data 401 represents encoded data of an image input from a camera. The voice data 402 represents encoded data of a voice input from a microphone.

The call control data 403 is used for controlling videophone operation. The call control data 403 according to the embodiment comprises a caller ID 411, caller's profile information 412, and a call recipient ID 413.

The caller ID 411 and the call recipient ID 413 are assigned to each communications equipment (comprising the image display apparatus 100) or each user that or who is connected to a videophone system by the IP telephone server 280 without duplication. The caller's profile information 412 comprises personal information such as an IP address of a caller, a unique address of equipment, and the name and the address of the caller.

With transmitting and receiving the videophone data, a call can be made among a plurality of communications equipment comprising the image display apparatus 100 by using videophone.

Referring back to FIG. 3, in the image display apparatus 100 according to the embodiment, videophone data comprising image data taken by the camera 246 and voice data collected through the microphone 242 is transmitted through the network controller 255 when a call is made by using videophone. Additionally, in the image display apparatus 100, image data separated from the videophone data received through the network controller 255 is displayed on the display 224, and voice data separated from the received videophone data is output from the speaker 236. Image data according to the embodiment may be either moving image data or still image data.

Furthermore, in the image display apparatus 100, user's instructions are received from the remote controller 120 through the operational input module 253, so that a television function and a videophone function are controlled according to the instructions.

The flash memory 261 of the image display apparatus 100 according to the embodiment stores a person database, a list of identified users, and an incoming call permission/rejection database that are used by the IP telephone program.

Figure 5:
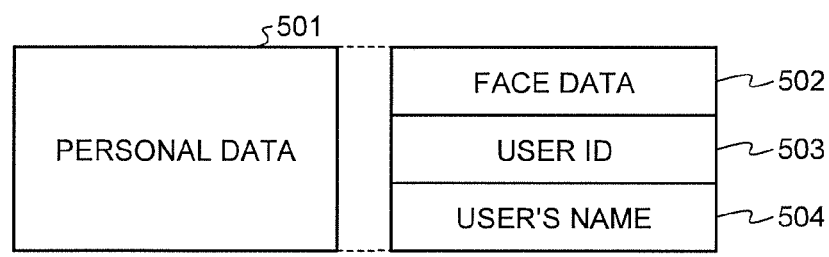
FIG. 5 is an exemplary schematic diagram illustrating personal data controlled in a person database in the first embodiment.

The person database stores personal data of each user using the image display apparatus 100. FIG. 5 illustrates personal data 501 that is controlled in the person database. The personal data 501 comprises face data 502, a user ID 503, and a user's name 504. The face data 502 is image data taken by the camera 246 and necessary for carrying out user identification. The user ID 503 is a unique ID assigned for each user using the image display apparatus 100. The name of a specific user belonging to the personal data 501 is registered in the user's name 504.

The list of identified users retains user IDs identifying users identified by the image display apparatus 100 as the users thereof. When a user is identified based on image data taken by the camera 246, a user ID is newly added to the list while when the user becomes absent the user ID is deleted from the list.

Figure 6:
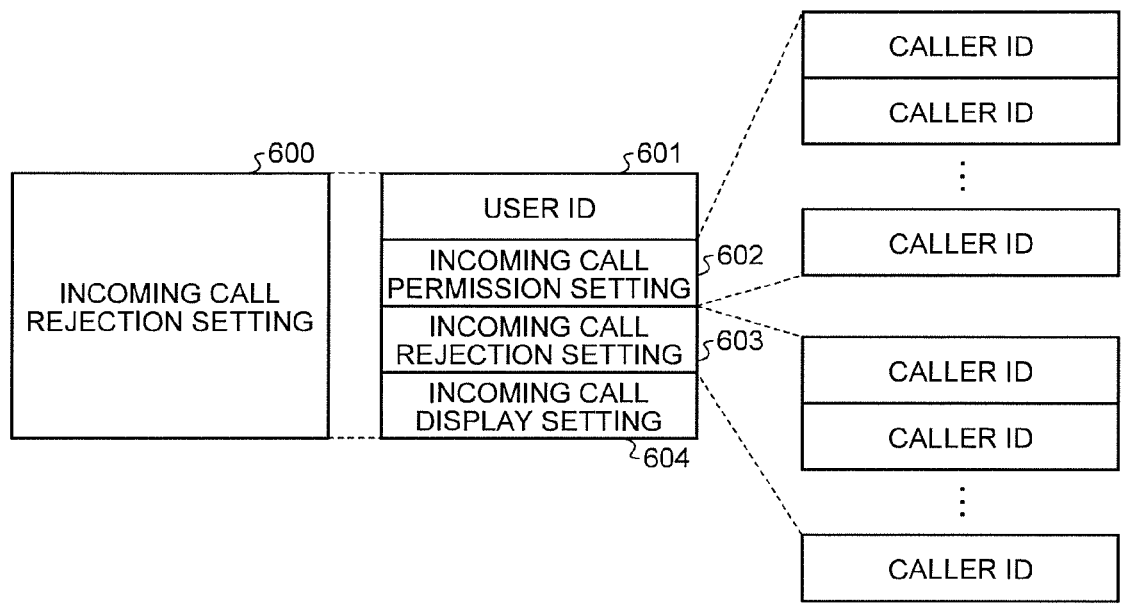
FIG. 6 is an exemplary schematic diagram illustrating a table structure of an incoming call permission/rejection determination database in the first embodiment.

The incoming call permission/rejection database stores, for each user using the image display apparatus 100, an incoming call rejection setting 600 to determine whether or not to reject an incoming call. FIG. 6 is a schematic diagram illustrating a table structure of the incoming call permission/rejection database. As illustrated in FIG. 6, the incoming call rejection setting 600 comprises a user ID 601, an incoming call permission setting 602, an incoming call rejection setting 603, and an incoming call display setting 604 in an associated manner.

The incoming call rejection setting 603 stores a setting to reject transmitting and receiving videophone data, in other words, a setting to reject an incoming call of videophone. The incoming call rejection setting 603 according to the embodiment retains caller IDs identifying callers who are targets of incoming call rejection as the setting to reject an incoming call of videophone.

The incoming call permission setting 602 stores a setting to permit videophone data to be transmitted and received, in other words, a setting to permit an incoming call of videophone. The incoming call permission setting 602 according to the embodiment retains caller IDs identifying callers who are targets of incoming call permission as the setting to permit an incoming call of videophone to be received.

The incoming call display setting 604 retains a setting of whether to display that there has been an incoming call when transmitting and receiving videophone data is rejected, in other words, the incoming call of videophone is rejected to be received.

With the use of the above-described information stored in the flash memory 261, various processing is carried out. Referring back to FIG. 3, the structure is described in detail.

The camera image decoder 308 encodes image data produced by the camera image processor 248 so as to obtain image data of imaged users using the image display apparatus 100. The image data has been taken by the camera 246 and represents an external environment of the image display apparatus 100. In the embodiment, the image data is used to identify users existing outside the image display apparatus 100, in other words, to identify users using the image display apparatus 100. In the embodiment, user identification is carried out by exemplarily using image data. The user identification, however, can be carried out based on any environmental information representing an external environment of the apparatus.

The microphone voice decoder 309 encodes voice data converted by the AD converter 245 so as to obtain voice data collected through the microphone.

The voice data and the image data are output to the call function controller 306 and the person identifier 314.

The person identifier 314 automatically identifies users who are using the image display apparatus 100, in other words, the user IDs specifying persons existing in an external environment surrounding the image display apparatus 100, from the image data decoded by the camera image decoder 308 with reference to the person database.

The person identifier 314 according to the embodiment also assembles the person database. The person identifier 314 extracts the face of a user of the image display apparatus 100 from image data taken by the camera 246 so as to produce face data. The person identifier 314 then produces personal data and stores the personal data in the person database. In the personal data, the produced face data is associated with a user ID that is assigned to the face data and unique for each user and the name of the user represented by the face data. In this regard, the user's name is input from the operational input module 253. This registration operation is carried out by the user himself/herself through a menu screen, for example. In this way, the image display apparatus 100 having the above-described function can receive registration of the face and the name of each user using videophone.

When personal data of each user has been registered, the person identifier 314 automatically produces face data of the face of a person imaged in image data that is input from the camera 246 through the camera image processor 248 and the camera image encoder 308. The person identifier 314 then searches through the person database so as to determine whether the automatically produced face data coincides with face data of personal data stored in the person database, on personal data-to-personal data basis. If the produced face data coincides with one of the face data stored in the person database, the person identifier 314 adds the user ID corresponding to the face data to the list of identified users. This function enables persons existing in a surrounding area of the image display apparatus 100 to be automatically added to the list of identified users. When face data corresponding to a user ID registered in the list of identified users becomes not detected, the person identifier 314 deletes the user ID from the list of identified users. In this way, the list of identified users is updated according to a change of persons existing in a surrounding area of the image display apparatus 100.

In the image display apparatus 100 according to the embodiment, when a user is identified with reference to the list of identified users as a person who is permitted to make a call to a videophone caller, the user is permitted to make a call to the caller.

The videophone data receiver 302 receives from the communications equipment 180 through the network controller 255 videophone data for communicating with the communications equipment 180. The videophone data received by the videophone data receiver 302 is output to the videophone data separator 303.

The videophone data separator 303 separates the videophone data input from the videophone data receiver 302 into the voice data 401, the voice data 402, and the call control data 403. The call control data 403 thus separated is input to the call function controller 306 without any change.

The image data decoder 304 decodes the voice data 401 thus separated and outputs the decoded image data to the call function controller 306. The voice data decoder 305 decodes the voice data 402 thus separated and outputs the decoded voice data to the call function controller 306.

The call function controller 306 controls a call function of videophone between the image display apparatus 100 and the communications equipment 180. For example, in response to an input of the call control data 403 separated by the videophone data separator 303, the call function controller 306 determines whether the call recipient ID 413 comprised in the call control data 403 coincides with an ID identifying the image display apparatus 100, on which the call function controller 306 is functioning. When determining that they coincide with each other, the call function controller 306 outputs the caller ID 411 comprised in the call control data 403 to the incoming call permission/rejection determiner 307, and requests the incoming call permission/rejection determiner 307 to determine whether to permit an incoming call to be received.

The call function controller 306 starts a call control between the image display apparatus 100 and the communications equipment 180 identified with the caller ID 411, only when the incoming call permission/rejection determiner 307 determines to permit the incoming call. When the call control starts, the call function controller 306 superimposes the voice data 401 decoded by the image data decoder 304 and of the caller side, and image data input from the camera image encoder 308 and of the recipient side, and thereafter outputs the superimposed image to the image processor 223.

In addition, the call function controller 306 carries out correction processing such as noise canceling and echo canceling on the voice data 402 decoded by the voice data decoder 305, and outputs the processed voice data to the voice processor 233.

Accordingly, the image processor 223 carries out image data combination, and thereafter the display 224 displays image data comprising image data of the caller and recipient sides. The voice processor 233 carries out voice data combination, for example. Then, the DA converter 235 converts the combined voice data into a voice. Thereafter, the voice of the caller side is output from the speaker 236.

When the network controller 255 receives videophone data from the communications equipment 180, the incoming call permission/rejection determiner 307 determines whether to permit the network controller 255 to transmit and receive videophone data with respect to the communications equipment 180 having sent the videophone data, based on a user ID specifying a person who is identified as being in a surrounding area of the image display apparatus 100. The incoming call permission/rejection determiner 307 according to the embodiment determines whether to permit a call to be made with videophone data based on a user ID of the user IDs stored in the list of identified users and the incoming call permission setting and the incoming call rejection setting that correspond to each other in the incoming call permission/rejection determination database.

The incoming call permission/rejection determiner 307 according to the embodiment registers the incoming call permission setting 602 and the incoming call rejection setting 603 in the incoming call permission/rejection determination database. The incoming call permission setting 602 permits a user using the videophone function of the image display apparatus 100 to receive a call from a specific caller while the incoming call rejection setting 603 does not permit a user using the videophone function of the image display apparatus 100 to receive a call from a specific caller. Accordingly, a setting to permit or reject making a call to a specific caller can be made for each user of the videophone of the image display apparatus 100. In addition, whether an incoming call is displayed when the incoming call permission/rejection determiner 307 does not permit making a call to a specific caller is preset in the incoming call display setting 604 of the incoming call permission/rejection determination database.

According to the setting, the incoming call permission/rejection determiner 307 determines whether to display on the display 224 that there has been an incoming call, based on each of the user IDs stored in the list of identified users when it is determined that the network controller 255 is not permitted to receive videophone data.

The incoming call permission/rejection determiner 307 makes a query to the person identifier 314 about persons currently existing in a surrounding environment of the image display apparatus 100 when receiving a request for carrying out incoming call permission/rejection determination from the call function controller 306. According to the query, the person identifier 314 outputs the list of identified users stored in the flash memory 261 to the incoming call permission/rejection determiner 307. The incoming call permission/rejection determiner 307 takes out the incoming call permission setting 602 and the incoming call rejection setting 603 from the incoming call permission/rejection determination database for each of the user IDs (also referred to as the identified user IDs) comprised in the list of identified users in such a manner that the taken out settings correspond to the identified user ID in the incoming call permission/rejection determination database. Then, the incoming call permission/rejection determiner 307 determines whether a user who is specified by the identified user ID is permitted to make a call to a caller.

Figure 7:
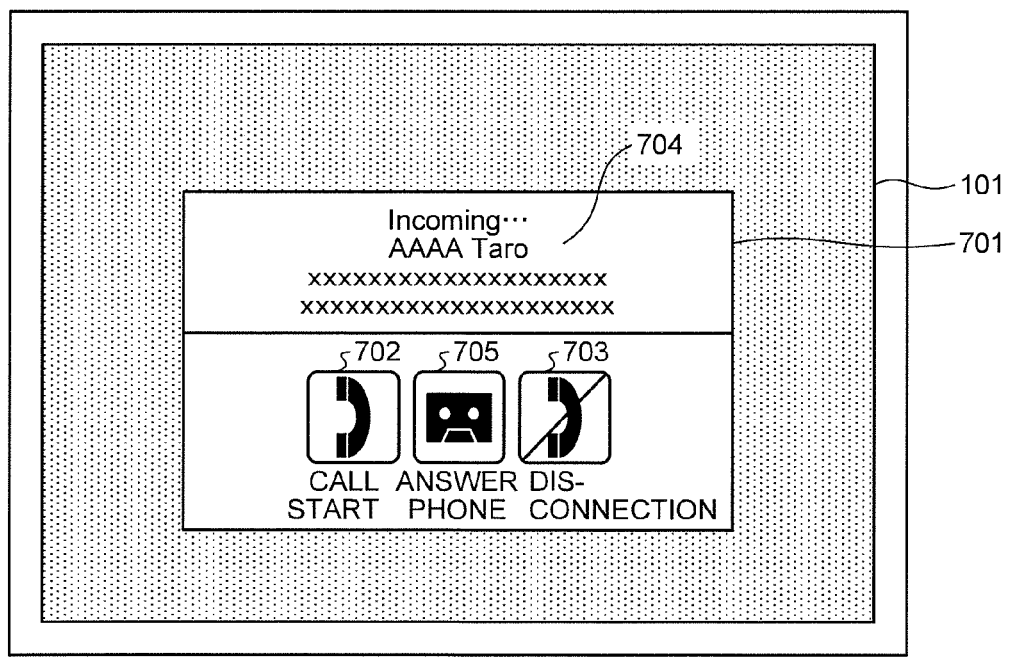
FIG. 7 is an exemplary schematic illustrating a display screen displayed by the image display apparatus according to the first embodiment when a call is permitted to be made.

When the incoming call permission/rejection determiner 307 determines that an identified user is permitted to make a call to a caller specified by the call function controller 306, the call function controller 306 superimposes an incoming call display on image data such as contents input from the image decoder 222, and thereafter outputs the superimposed image data to the display 224 through the image processor 223. FIG. 7 illustrates an example of an incoming call display screen displayed on the display 224 when a call is permitted to be made. As illustrated in FIG. 7, an incoming call notification window 701 is superimposed and displayed on contents on the display screen 101. The incoming call notification window 701 comprises a call start button 702 to start a call, an incoming call disconnection button 703 to forcibly disconnect an incoming call, a profile information field 704 in which a caller's profile is described, and an answer phone button 705 that records a message from a caller. A call made to a caller starts only when a user of videophone selects the call start button 702.

Figure 8:
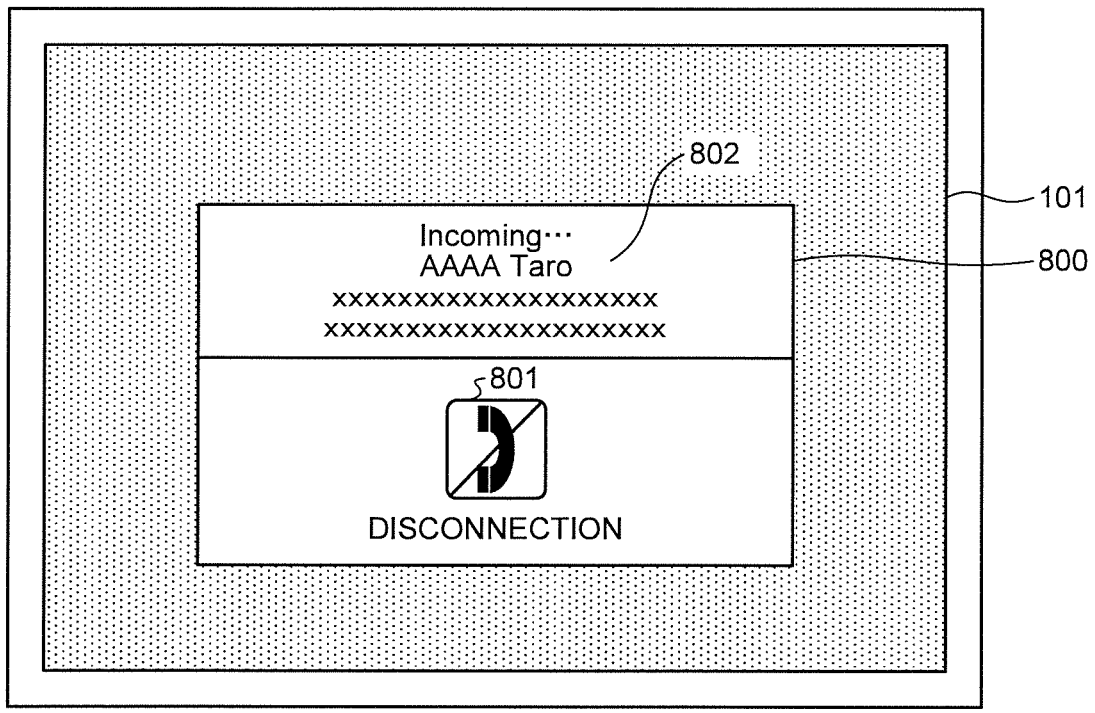
FIG. 8 is an exemplary schematic diagram illustrating a display screen displayed by the image display apparatus when a call is not permitted to be made, in the first embodiment.

When it is determined that an identified user is not permitted to make a call to a caller specified by the call function controller 306, the incoming call permission/rejection determiner 307 furthermore determines whether it is displayed that there has been the incoming call. When it is determined that the arrival of the incoming call is displayed, the call function controller 306 superimposes an incoming call display on image data such as contents input from the image decoder 222, and thereafter outputs the superimposed image data to the display 224 through the image processor 223. FIG. 8 illustrates an example of an incoming call display screen displayed on the display 224 when a call is not permitted to be made. As illustrated in FIG. 8, an incoming call notification window 800 is superimposed and displayed on contents on the display screen 101. The incoming call notification window 800 comprises an incoming call disconnection button 801 to forcibly disconnect an incoming call, and a profile information field 802 in which a caller's profile is described, but a call start button is excluded. When the incoming call notification window 800 illustrated in FIG. 8 is displayed, a user can only disconnect an incoming call, but cannot make a call.

On the other hand, when the incoming call permission/rejection determiner 307 determines that an identified user is not permitted to make a call to a caller and it is not displayed that there has been the incoming call, no windows to notify the identified user of an incoming call is displayed on the display screen 101. The user, thus, is even not aware that there has been the incoming call.

The image data encoder 310 encodes image data input to the call function controller 306 from the camera 246, and outputs the encoded image data to the videophone data generator 312.

The voice data encoder 311 encodes voice data input to the call function controller 306 from the microphone 242, and outputs the encoded voice data to the videophone data generator 312.

The videophone data generator 312 combines the voice data input from the voice data encoder 311, the image data input from the image data encoder 310, and call control data comprising information identifying the image display apparatus 100 so as to produce videophone data, and outputs the videophone data to the videophone data transmitter 313.

The videophone data transmitter 313 outputs the videophone data input from the videophone data generator 312 to the network controller 255. The network controller 255 transmits the input videophone data to a caller through the network 150.

In this way, the image display apparatus 100 according to the embodiment identifies users existing in a surrounding environment of the image display apparatus 100, and determines whether it is permitted to make a call according to an identified user. Consequently, when a user whom a call is intended to be made is absent under a condition where the image display apparatus 100 is shared by a plurality of users, it is prevented that another user answers the call.

Figure 9:
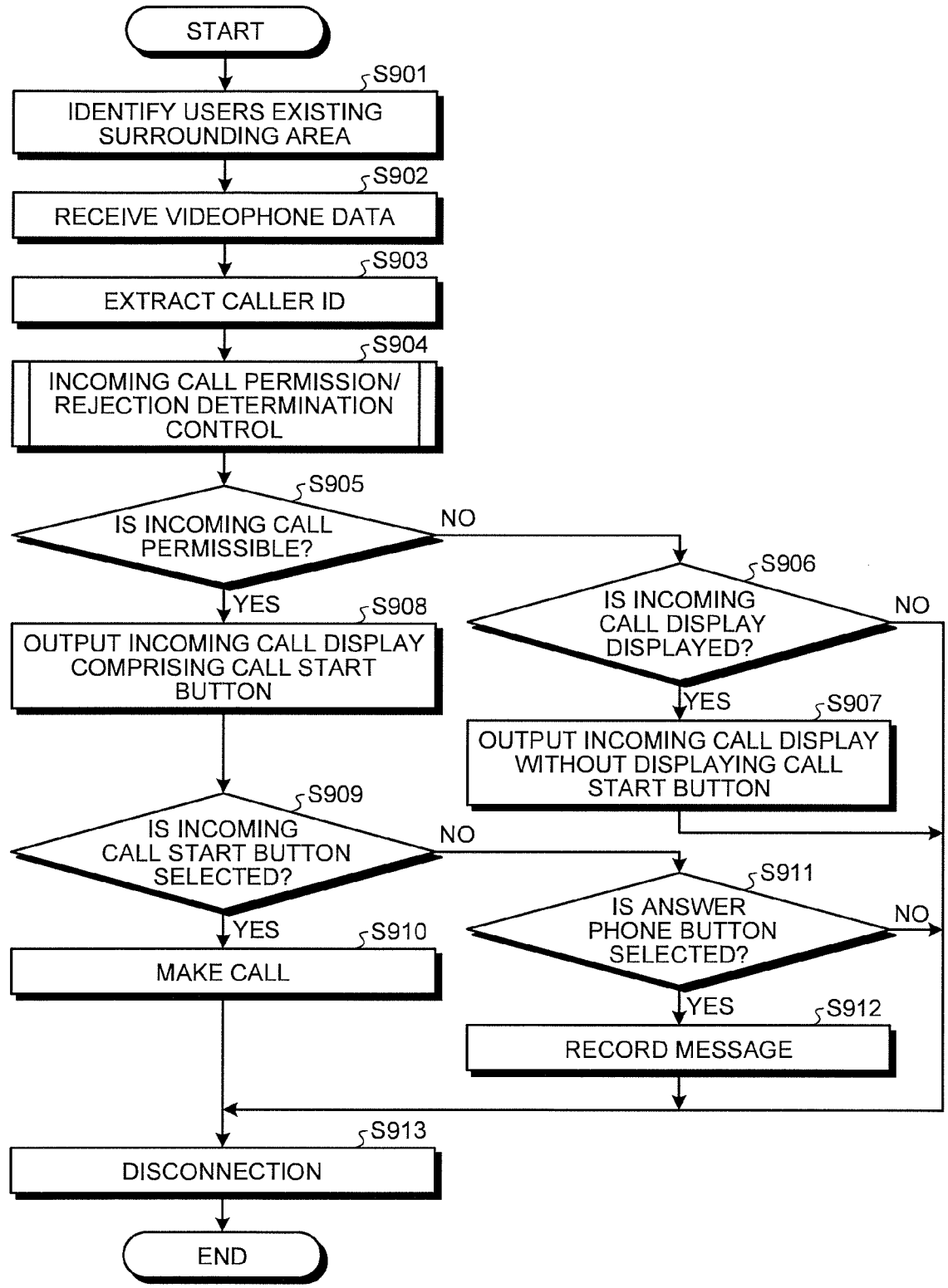
FIG. 9 is an exemplary flowchart illustrating a procedure upon arrival of an incoming call in the image display apparatus in the first embodiment.

Processing upon arrival of an incoming call in the image display apparatus 100 according to the embodiment is described below. FIG. 9 is a flowchart of the processing in the image display apparatus 100 according to the embodiment. Before the processing illustrated in the flowchart is carried out, personal data of users who want to use videophone needs to be registered in a person database. In the registration, a setting of whether a user is permitted to answer an incoming call from a specific caller is also made for each user as a preparation stage. The registration is realized by a menu operable with the remote controller 120, for example.

First, the person identifier 314 automatically identifies users existing in a surrounding area of the image display apparatus 100 from image data input from the camera image encoder 308, and updates a list of identified users (S901).

Then, the videophone data receiver 302 receives videophone data transmitted from a specific caller (S902). Thereafter, the videophone data separator 303 separates the received videophone data and outputs call control data to the call function controller 306.

The call function controller 306 extracts a caller ID from the input call control data (S903). As a result, the caller can be identified with the caller ID. Thereafter, control is carried out to determine whether an incoming call is permissible based on the list of identified users and the caller ID (S904).

Then, the call function controller 306 determines whether the incoming call is permissible based on the determination result of the incoming call permission/rejection determiner 307 (S905). When it is determined that the incoming call is permissible (Yes at S905), the call function controller 306 outputs an incoming call notification window comprising a call start button to the display 224 (S908). The call function controller 306 then determines whether a selection of the incoming call start button is received through the operational input module 253 (S909). If the selection of the call start button is received (Yes at S909), the call function controller 306 starts call control in videophone (S910), and the procedure proceeds to a disconnection stage after the call ends (S913).

On the other hand, if the selection of the call start button is not received, in other words, another button is selected (No at S909), the call function controller 306 determines whether an answer phone button is selected (S911). If the answer phone button is selected (Yes at S911), a massage is recorded (S912), and thereafter the procedure proceeds to the disconnection stage after the recording ends (S913). On the other hand, if the selection of the answer phone button is not received (No at S911), the procedure proceeds to the disconnection stage (S913) without carrying out any processing so as to end the procedure.

If the call function controller 306 determines that the incoming call is impermissible at 5905 (No at S905), the call function controller 306 determines whether to display the arrival of the incoming call based on the incoming call display setting 604 that corresponds to the currently identified user ID in the incoming call permission/rejection determination database (S906). If it is determined that the arrival of the incoming call is not displayed (No at S906), the procedure proceeds to the disconnection stage (S913) without carrying out any processing so as to end the procedure.

On the other hand, if the call function controller 306 determines that the arrival of the incoming call is displayed (Yes at S906), an incoming call notification window comprising no call start button is output to the display 224 (S907). Thereafter, the call function controller 306 carries out disconnection processing (S913) so as to end the procedure.

Figure 10:
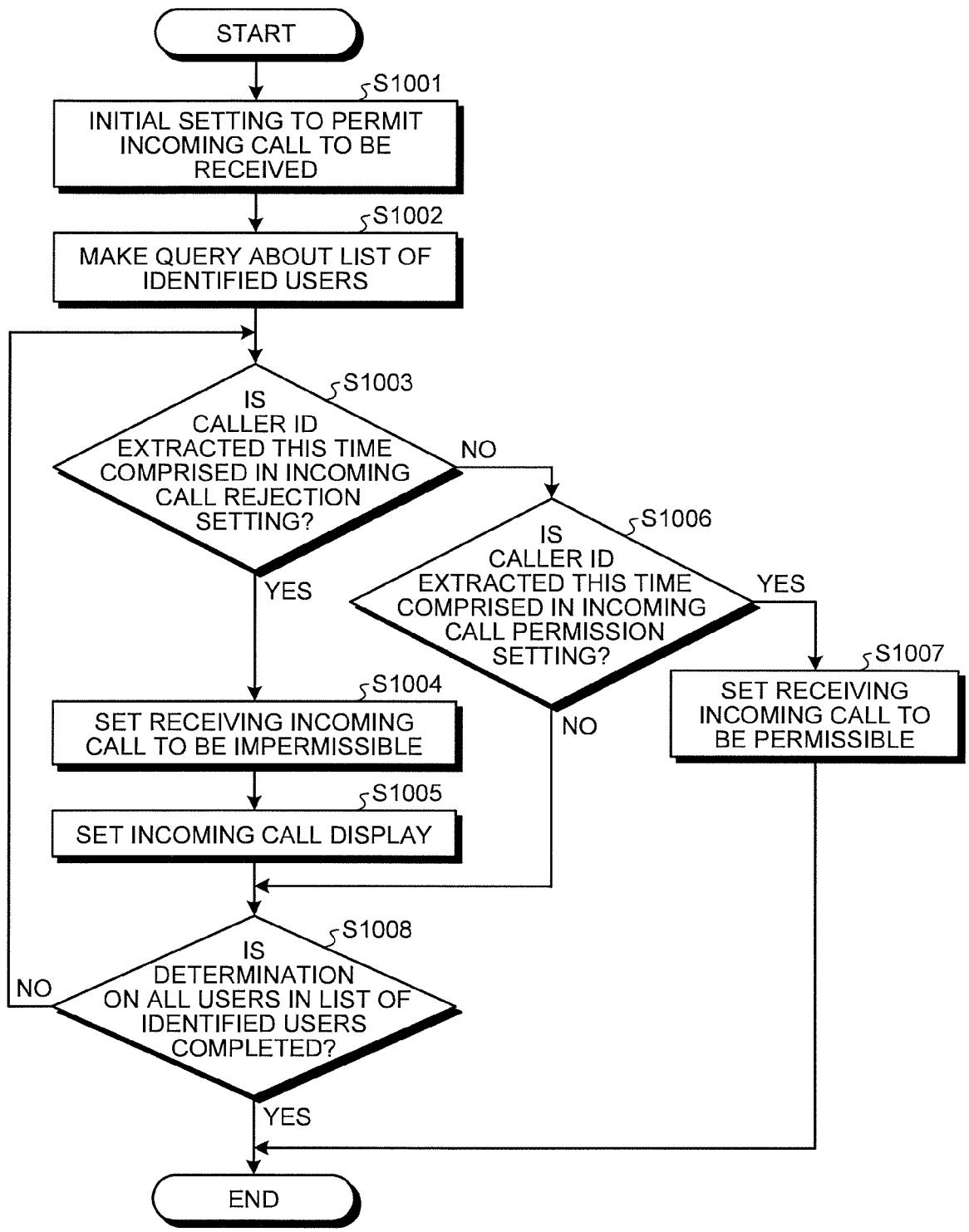
FIG. 10 is an exemplary flowchart illustrating incoming call permission/rejection determination control in the image display apparatus in the first embodiment.

The incoming call permission/rejection determination control at S904 of FIG. 9 in the image display apparatus 100 according to the embodiment is described below. FIG. 10 is a flowchart of the above-described processing in the image display apparatus 100 according to the embodiment. In the processing, the incoming call permission/rejection determiner 307 receives a request for incoming call permission/rejection determination and input of a caller ID identifying a caller from the call function controller 306.

First, the incoming call permission/rejection determiner 307 carries out an initial setting to permit receiving an incoming call when receiving the request for incoming call permission/rejection determination (S1001). The incoming call permission/rejection determiner 307 then makes a query to the person identifier 314 about a list of identified users (S1002). As a result, the incoming call permission/rejection determiner 307 acquires the list of identified users.

The incoming call permission/rejection determiner 307 determines whether the caller ID extracted this time is comprised in an incoming call rejection setting that corresponds to a user ID comprised in the list of identified users in an incoming call permission/rejection determination database (S1003). If it is determined that the caller ID is comprised in the incoming call rejection setting (Yes at S1003), the incoming call is set to be impermissible (S1004). Thereafter, an incoming call display is set according to an incoming call display setting that corresponds to the incoming call rejection setting in the incoming call permission/rejection determination database (S1005), and the procedure proceeds to S1008.

On the other hand, if the incoming call permission/rejection determiner 307 determines that the caller ID extracted this time is not comprised in the incoming call rejection setting that corresponds to a user ID comprised in the list of identified users in the incoming call permission/rejection database (No at S1003), the incoming call permission/rejection determiner 307 determines whether the caller ID is comprised in an incoming call permission setting that corresponds to the user ID in the incoming call permission/rejection determination database (S1006). If it is determined that the caller ID is not comprised in the incoming call permission setting (No at S1006), the procedure proceeds to S1008.

On the other hand, if the incoming call permission/rejection determiner 307 determines that the caller ID extracted this time is comprised in the incoming call permission setting that corresponds to a user ID comprised in the list of identified users in the incoming call permission/rejection database (Yes at S1006), the incoming call is set to be permissible (S1007) and thereafter the processing ends.

When the procedure proceeds to S1008, the incoming call permission/rejection determiner 307 determines whether determination is completely carried out on all of the user IDs comprised in the list of identified users (S1008). If it is determined that determination is not completely carried out on all of the user IDs (No at S1008), the procedure carries out processing again from S1003. On the other hand, if it is determined that determination is completely carried out on all of the user IDs (Yes at S1008), the processing ends.

In the embodiment as described in the processing procedure, when there is an incoming call of videophone, a user is basically permitted to make a call to a caller if the caller ID is not comprised in the incoming call rejection setting. If a caller ID indicating the caller this time is comprised in the incoming call rejection setting of a user among the users existing in a surrounding environment, and the caller ID is not comprised in the incoming call permission settings of the other users existing in the surrounding environment, a call from the caller is rejected to be received. If a caller ID indicating the caller this time is comprised in the incoming call permission setting of a user among the users existing in a surrounding environment, the user is permitted to make a call to the caller regardless whether the caller ID is comprised in the incoming call rejection settings of the other users.

In the image display apparatus 100 according to the embodiment, detailed incoming call setting using the incoming call permission setting and the incoming call rejection setting can be set for each user. In this way, in the image display apparatus 100, incoming call permission can be controlled according to a circumstance of a plurality of persons who share a videophone account when there is an incoming call made to any one of the users.

In the related art, when there is an incoming call made to an image processing apparatus that has a videophone function and is shared by a plurality of persons, any of the users can answer the call. In such a case, a call that a certain user does not want other persons to answer the call is received by someone else. In contrast, the image display apparatus 100 having the above-described structure according to the embodiment can control that a call from a specific caller is made to only a user who is permitted to make a call to the specific caller by setting the permission in the incoming call permission/rejection determination database. As a result, privacy of each user can be protected even if a plurality of persons share the image display apparatus 100.

In addition, in the related art, when there is an incoming call made to an image processing apparatus that has a videophone function and is shared by a plurality of persons, an incoming call notification is displayed on a television screen even if the incoming call notification does not relate to persons existing in a surrounding area of the television. When permission of making a call is controlled simply based on a user in the related art, an incoming call notification is displayed on the display screen even when the call is not permitted to be made. As a result, looking and listening of contents are hindered. In contrast, in the embodiment, when a call is not permitted to be made, a setting to display or not to display an incoming call notification can be made for each user. Accordingly, looking and listening of contents can be prevented from being hindered by carrying out control so as not to display an incoming call notification when a user exists who is not permitted to make a call to a specific caller. As a result, convenience of looking and listening of television can be improved.

Various modifications of the embodiment can be made as described below.

In the first embodiment, users existing in a surrounding environment of the image display apparatus 100 are identified based on image data taken by the camera 246. The user identification is not limited to be carried out based on image data. Users may be identified based on external environmental information. An example is described below in which user identification is carried out by using voiceprint data instead of image data, as a first modification of the first embodiment.

Figure 11:
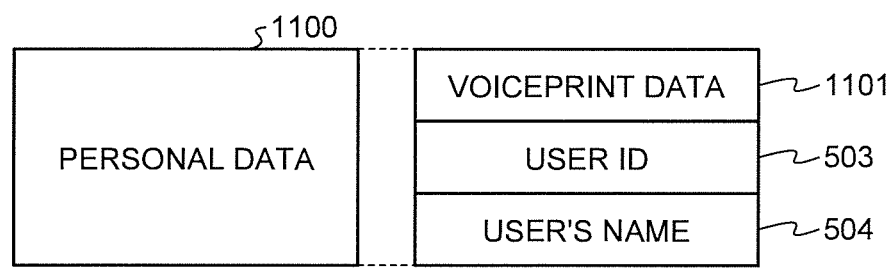
FIG. 11 is an exemplary schematic diagram illustrating a personal data structure according to a first modification of the first embodiment.

In the image display apparatus 100 according to the first modification, a structure of personal data of the person database in the flash memory 261 differs from that of the first embodiment. FIG. 11 is a schematic diagram illustrating the structure of the personal data according to the first modification. As illustrated in FIG. 11, personal data 1100 comprises voiceprint data 1101, the user ID 503, and the user's name 504 that correspond to each other.

In the image display apparatus 100 according to the first modification, the person identifier 314 extracts and makes voiceprint data comprised invoice data input from the microphone 242 through the microphone voice encoder 309, produces personal data comprising the voiceprint data, a user ID, and a user's name in an associated manner, and registers the personal data in the person database. A user of the image display apparatus 100 registers own voiceprint data and name in advance.

When extracting voiceprint data from voice data input from the microphone voice encoder 309, the person identifier 314 compares the extracted voiceprint data with voiceprint data of personal data in the person database so as to carry out user identification. Based on the user identification result, the person identifier 314 updates the list of identified users. Accordingly, a person existing in the environment can be identified as a user based on a voice made by the person.

Thereafter, the image display apparatus 100 according to the first modification permits making a call between a caller and a user who is permitted to make a call to the caller only when the user is identified in the same manner as the first embodiment.

In the first embodiment and the first modification, biological body identification using a face and a voice is used as a user identification method. The user identification method, however, is not limited to the biological body identification. For example, hardware identification or password identification may be employed. An example is described below in which the user identification is carried out by using wireless equipment, as a second modification of the first embodiment. Processing other than the user identification is the same as that of the first embodiment, and thus description thereof is omitted.

Figure 12:
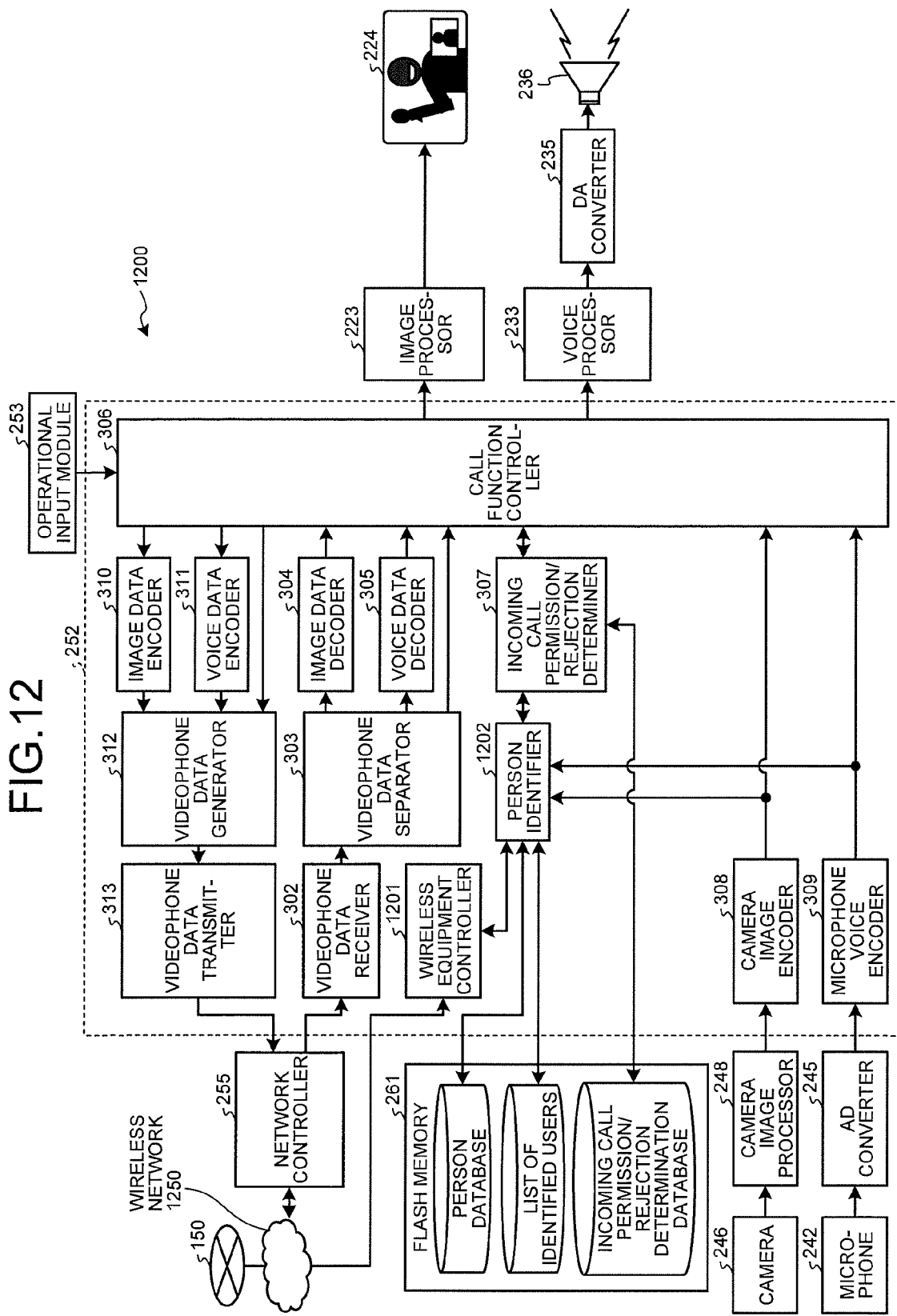
FIG. 12 is an exemplary block diagram illustrating a software function of an IP telephone program of the image display apparatus according to a second modification of the first embodiment.

FIG. 12 is a block diagram illustrating a software function of an IP telephone program executed by the CPU 252 of an image display apparatus 1200 according to the second modification of the first embodiment. The IP telephone program according to the second modification differs from the IP telephone program according to the first embodiment in that a wireless equipment controller 1201 is added and a person identifier 1202 is provided that carries out different processing from that of the person identifier 314. In the following description, the same elements as the first embodiment are labeled with the same numerals, and description thereof is omitted.

Figure 13:
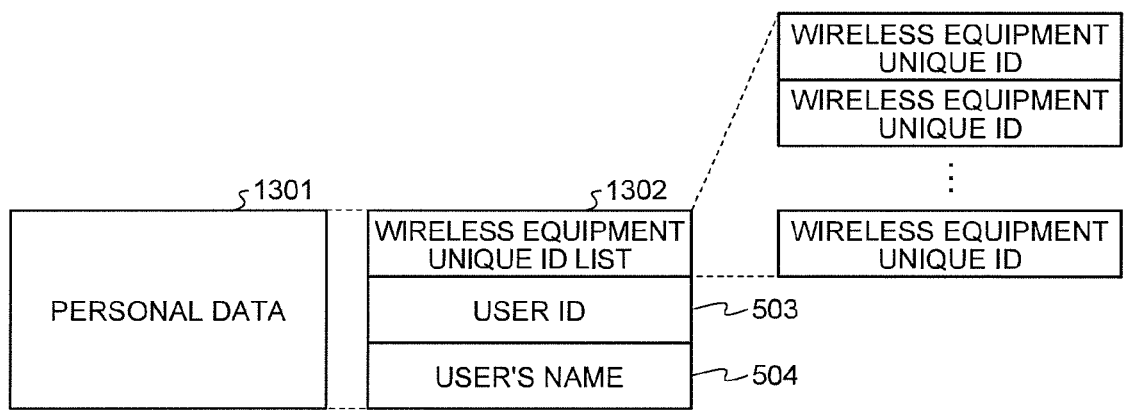
FIG. 13 is an exemplary schematic diagram illustrating a data structure of personal data stored in a person database in the second modification.

In addition, a structure of personal data stored in the person database differs from that of the first embodiment. FIG. 13 is a schematic illustrating an exemplary data structure of personal data 1301 stored in the person database according to the second modification. As illustrated in FIG. 13, the personal data 1301 comprises a wireless equipment unique ID list 1302, the user ID 503, and the user's name 504 in an associated manner. The wireless equipment unique ID list 1302 stores a plurality of pieces of wireless equipment unique IDs each identifying wireless equipment used by a user identified with the user ID 503. In the second modification, it is determined whether wireless equipment identified with a certain wireless equipment unique ID exists, so that it is determined whether a user using the wireless equipment exists. Any unique ID assigned to each wireless equipment may be used as the wireless equipment unique ID. For example, an MAC address may be used.

Accordingly, a user who uses the videophone of the image display apparatus 1200 can register a plurality of pieces of wireless equipment owned by the user and the user's name in the image display apparatus 1200 in an associated manner. This registration operation is carried out by the user himself/herself through a menu, for example.

Referring back to FIG. 12, the wireless equipment controller 1201 has a function of an access point of wireless equipment, and acquires a wireless equipment unique ID identifying wireless equipment that accesses the image display apparatus 1200 through a wireless network 1250. The wireless equipment controller 1201 can also control the wireless equipment. The wireless equipment controller 1201 outputs the acquired wireless equipment unique ID to the person identifier 1202.

The person identifier 1202 extracts a user ID that corresponds to, in the personal data 1301, the wireless equipment unique ID input from the wireless equipment controller 1201. The person identifier 1202 determines that a user identified with the extracted user ID exists in a surrounding environment of the image display apparatus 1200, and adds the user ID to the list of identified users.

The image display apparatus 1200 according to the modification then refers to the list of identified users, and permits making a call between a caller and a user who is permitted to make a call to the caller only when the user is identified in the same manner as the first embodiment.

In the second modification of the first embodiment, wireless equipment is used as the user identification technique using equipment. The user identification technique is not limited to use wireless equipment. Other equipment may be used. An example is described below in which the user identification is carried out by using wired equipment, as a third modification of the first embodiment. Processing other than the user identification is the same as that of the first embodiment, and thus description thereof is omitted.

Figure 14:
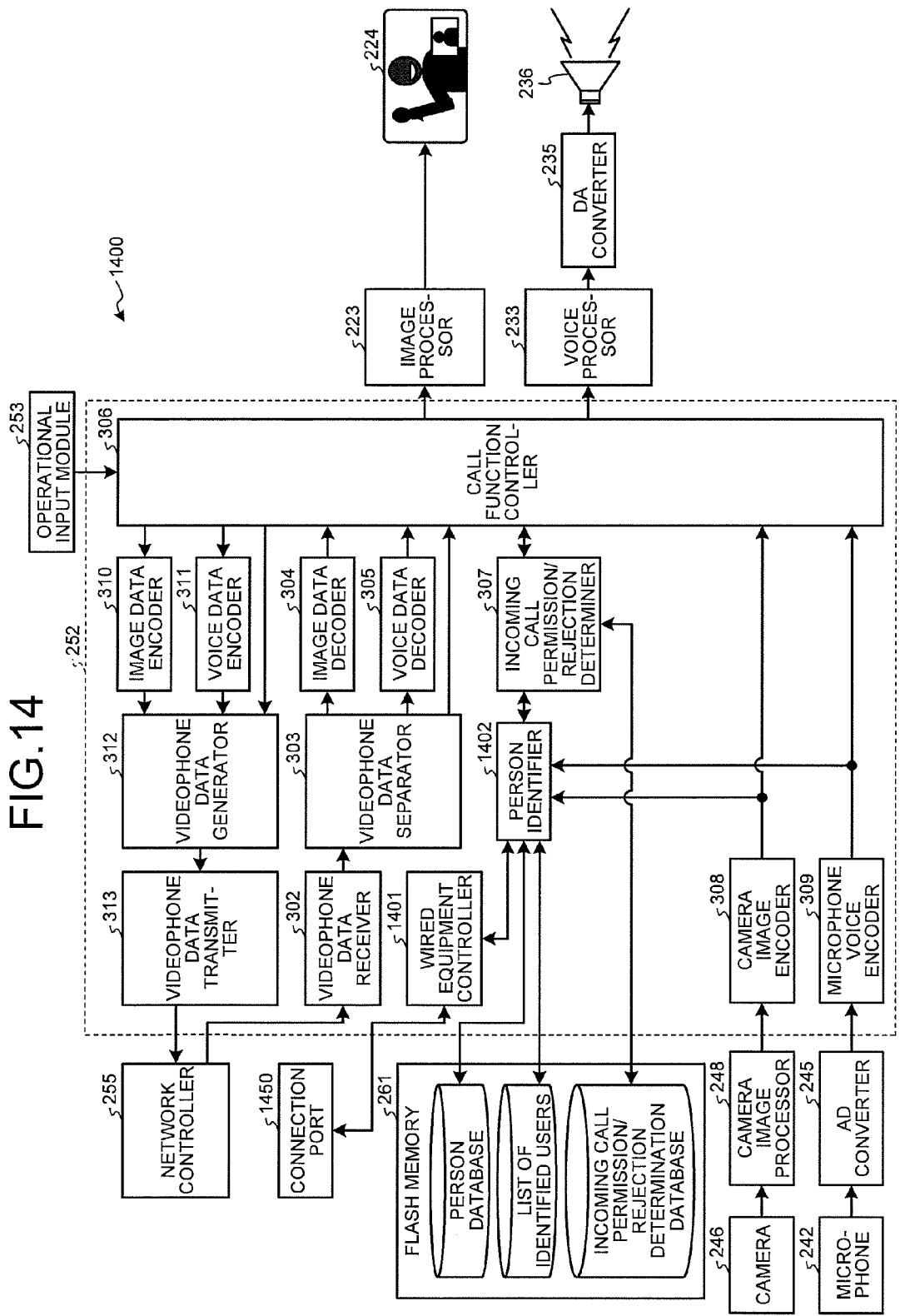
FIG. 14 is an exemplary block diagram illustrating a function of an IP telephone program of the image display apparatus according to a third modification of the first embodiment.

FIG. 14 is a block diagram illustrating a function of an IP telephone program executed by the CPU 252 of an image display apparatus 1400 according to the third modification of the first embodiment. The IP telephone program according to the third modification differs from the IP telephone program according to the first embodiment in that a wired equipment controller 1401 is added and a person identifier 1402 is provided that carries out different processing from that of the person identifier 314. In the following description, the same elements as the first embodiment are labeled with the same numerals, and description thereof is omitted.

Figure 15:
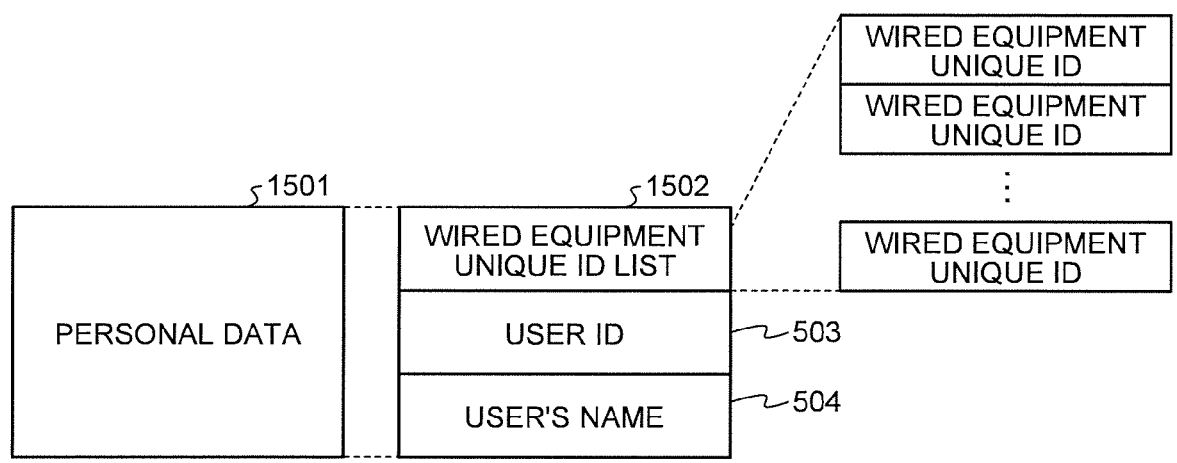
FIG. 15 is an exemplary schematic diagram illustrating a data structure of personal data stored in a person database in the third modification.

FIG. 15 is a schematic illustrating an exemplary data structure of personal data 1501 stored in the person database according to the third modification. As illustrated in FIG. 15, the personal data 1501 comprises a wired equipment unique ID list 1502, the user ID 503, and the user's name 504 in an associated manner. The wired equipment unique ID list 1502 stores a plurality of pieces of wired equipment unique IDs each identifying equipment that is used by a user identified with the user ID 503 and is connected to a wire through a connection port 1450. In the third modification, it is determined whether wired equipment identified with a certain wired equipment unique ID exists, so that it is determined whether a user who owns the wired equipment exists. Any unique ID assigned for each equipment may be used as the wired equipment ID. Examples of the wired equipment comprise a universal serial bus (USE) microphone, a digital still camera, equipment connected with high-definition multimedia interface (HDMI), and an input device such as a keyboard.

A user who uses the videophone of the image display apparatus 1400 can register wired equipment owned by the user and the user's name in the image display apparatus 1400 in an associated manner. This registration operation is carried out by the user himself/herself through a menu, for example. Once wired equipment, such as a USE microphone, is coupled to the image display apparatus 1400, user identification can be carried out.

Referring back to FIG. 14, the wired equipment controller 1401 acquires a wired equipment unique ID identifying the wired equipment coupled with the connection port 1450. The wired equipment controller 1401 can also control the wired equipment. The wired equipment controller 1401 outputs the acquired wired equipment unique ID to the person identifier 1402.

The person identifier 1402 extracts a user ID that corresponds to, in the personal data 1501, the wired equipment unique ID input from the wired equipment controller 1401. The person identifier 1402 determines that a user identified with the extracted user ID exists in a surrounding environment of the image display apparatus 1400, and adds the user ID to the list of identified users.

The image display apparatus 1400 according to the third modification then refers to the list of identified users, and permits making a call between a caller and a user who is permitted to make a call to the caller only when the user is identified in the same manner as the first embodiment.

In the embodiment and the modifications, biological body identification and identification using equipment are employed as the user identification techniques. The user identification technique is not limited to those techniques. For example, identification using security information may be employed. An example is described below in which the user identification is carried out by using a password, as a fourth modification of the first embodiment. Processing other than the user identification is the same as that of the first embodiment, and thus description thereof is omitted.

Figure 16:
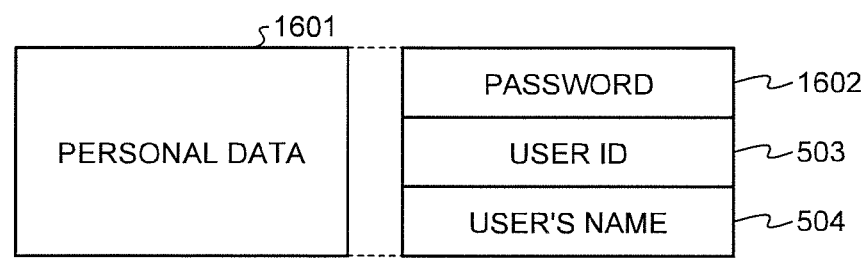
FIG. 16 is an exemplary schematic diagram illustrating a data structure of personal data according to a fourth modification of the first embodiment.

In the image display apparatus according to the fourth modification, a password used for user identification is retained in personal data of the person database. FIG. 16 is a schematic illustrating a data structure of personal data according to the fourth modification of the first embodiment. As illustrated in FIG. 16, personal data 1601 comprises a password 1602, the user ID 503, and the user's name 504 in an associated manner.

A user who uses the videophone of the image display apparatus according to the fourth modification can register an own password and user's name in the image display apparatus in an associated manner. This registration operation is carried out by the user himself/herself through a menu, for example. Once a password and a user's name are input from the remote controller 120, for example, user identification can be carried out.

The person identifier according to the fourth modification carries out user identification based on whether a password and a user's name that are input from the operational input module 253 coincide with a password and a user's name that are stored in the personal data. The user ID specifying the user determined as matched is stored in the list of identified users.

The image display apparatus according to the fourth modification then refers to the list of identified users, and permits making a call between a caller and a user who is permitted to make a call to the caller only when the user is identified in the same manner as the first embodiment.

In the first embodiment, whether an incoming call is rejected to be received is determined based on persons existing in a surrounding environment of the image display apparatus. The determination basis of whether an incoming call is rejected to be received, however, is not limited to persons. In a second embodiment, an example is described in which a person's age is used as the determination basis of whether an incoming call is rejected to be received.

Figure 17:
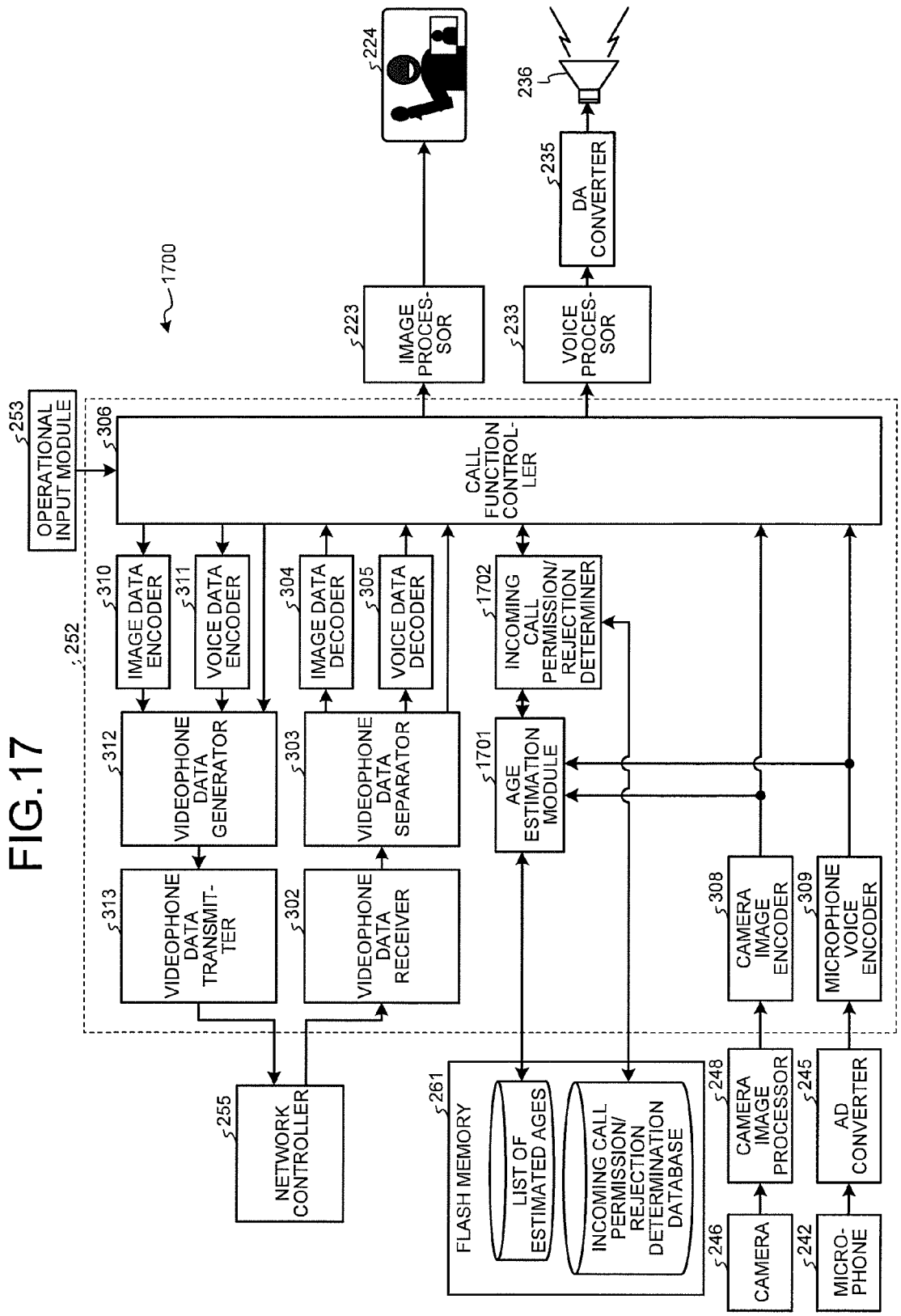
FIG. 17 is an exemplary block diagram illustrating a software function of an IP telephone program of an image display apparatus according to a second embodiment.

FIG. 17 is a block diagram illustrating a software function of an IP telephone program executed by the CPU 252 of an image display apparatus 1700 according to the second embodiment. The IP telephone program according to the present embodiment differs from the IP telephone program according to the first embodiment in that the person identifier 314 is removed, an age estimation module 1701 is added, and an incoming call permission/rejection determiner 1702 is provided that carries out different processing from that of the incoming call permission/rejection determiner 307. In the following description, the same elements as the first embodiment are labeled with the same numerals, and description thereof is omitted.

The image display apparatus 1700 according to the embodiment has a function to automatically identify an age of a person existing in a surrounding area of the image display apparatus 1700 by face identification, and permits making a call between a caller and a person whose age is permitted to make a call to the caller only when the person is identified. Accordingly, the image display apparatus 1700 according to the embodiment carries out control so as not to permit a person to make a call to a caller when the person alone is identified whose age is not permitted to make a call to the caller, for example. In this way, the image display apparatus 1700 has a parental control function, and can prevent a child under a predetermined age from making a call to a suspicious person, for example.

The age estimation module 1701 automatically estimates the age of a person existing in a surrounding environment of the image display apparatus 1700 from image data input from the camera image encoder 308 based on face identification. The estimated age information is added to a list of estimated ages to update the list.

The list of estimated ages of the flash memory 261 retains age information estimated in the image display apparatus 1700 based on face identification. When the age of a user is estimated from image data taken by the camera 246, age information indicating the estimated age is added to the list while when the user becomes absent, the age information is deleted from the list.

Figures 18, 19:
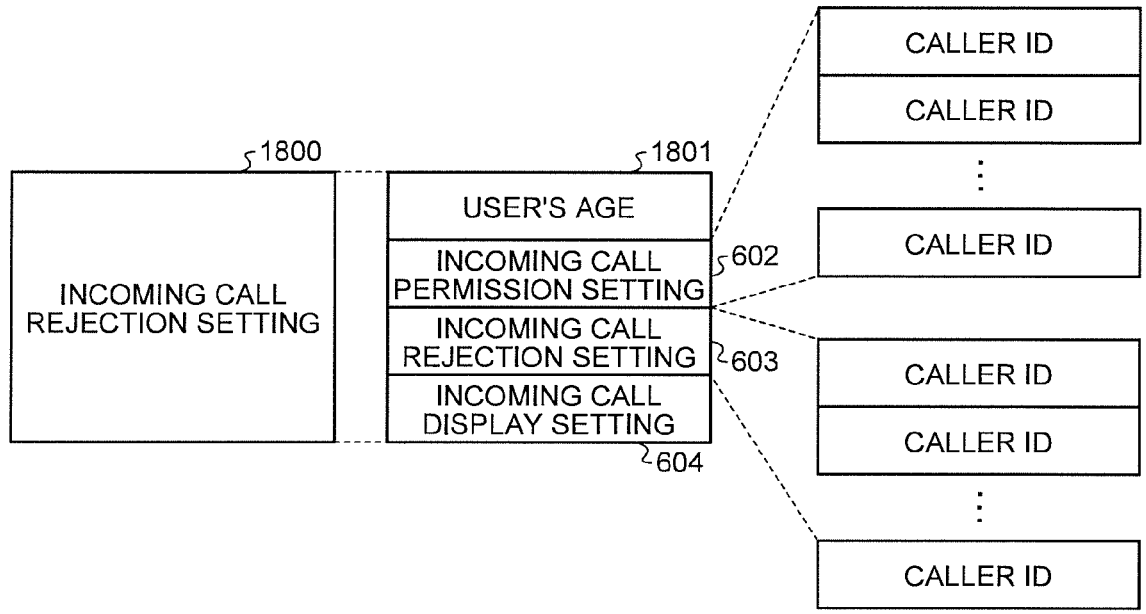
FIG. 18 is an exemplary schematic diagram illustrating a data structure of an incoming call rejection setting in the second embodiment.
FIG. 19 is an exemplary schematic diagram illustrating a determination example using an incoming call permission/rejection determination database of the image display apparatus in the second embodiment.

An incoming call permission/rejection determination database of the flash memory 261 stores an incoming call rejection setting. FIG. 18 is a schematic illustrating a data structure of an incoming call rejection setting 1800. As illustrated in FIG. 18, the incoming call rejection setting 1800 comprises a user's age 1801, the incoming call permission setting 602, the incoming call rejection setting 603, and the incoming call display setting 604 in an associated manner.

In the same manner as the first embodiment, the incoming call rejection setting 603 retains caller IDs identifying callers whose calls are rejected to be received. The incoming call permission setting 602 retains caller IDs identifying callers whose calls are permitted to be received. The incoming call display setting 604 retains a setting of whether to display that there has been an incoming call when transmitting and receiving videophone data is rejected to be carried out, in other words, an incoming call of videophone is rejected to be received.

When the network controller 255 receives videophone data from the communications equipment 180, the incoming call permission/rejection determiner 1702 determines whether to permit the network controller 255 to transmit and receive videophone data with respect to the communications equipment 180 having transmitted the videophone data based on age information indicating a person who is identified as being in the surrounding area of the image display apparatus 1700. The incoming call permission/rejection determiner 1702 according to the embodiment determines whether to permit a call with videophone data to be made based on each age information stored in the list of estimated ages and the incoming call permission setting and the incoming call permission rejection setting that correspond to each other in the incoming call permission/rejection determination database.

The incoming call permission/rejection determiner 1702 according to the embodiment registers the incoming call permission setting 602 and the incoming call rejection setting 603 in the incoming call permission/rejection determination database. The incoming call permission setting 602 permits a specific user of videophone to receive a call from a specific caller while the incoming call rejection setting 603 does not permit a specific user of videophone to receive a call from a specific caller. Accordingly, a setting of whether a call is permitted to be made between a user and a specific caller can be made according to the user's age. When a call is not permitted to be made to a specific caller, a setting of whether the arrival of an incoming call is displayed can be additionally made in the incoming call display setting 604 of the incoming call permission/rejection determination database.

According to the setting, the incoming call permission/rejection determiner 1702 determines whether to display on the display 224 that videophone data has been received based on each age information stored in the list of estimated ages when determining that the network controller 255 is not permitted to receive videophone data.

The incoming call permission/rejection determiner 1702 makes a query to the age estimation module 1701 about the ages of persons existing in a surrounding environment of the image display apparatus 1700 when receiving a request for incoming call permission/rejection determination from the call function controller 306. According to the query, the age estimation module 1701 outputs the list of estimated ages stored in the flash memory 261 to the incoming call permission/rejection determiner 1702. The incoming call permission/rejection determiner 1702 takes out the incoming call permission setting 602 and the incoming call rejection setting 603 from incoming call permission/rejection determination database for each age (also referred to as an identified age) comprised in the list of estimated ages in such a manner that the taken out settings correspond to the identified age in the incoming call permission/rejection determination database. Then, the incoming call permission/rejection determiner 1702 determines whether the identified age is permitted to make a call to a caller. Other processing is the same as that of the incoming call permission/rejection determiner 1702, and thus description thereof is omitted.

FIG. 19 is a schematic diagram illustrating a determination example using the incoming call permission/rejection determination database. In the example illustrated in FIG. 19, the incoming call permission/rejection determiner 1702 does not permit making a call to the caller identified with a caller ID when the caller ID is not comprised in the incoming call rejection setting and the incoming call permission setting that correspond to an identified age. In the example illustrated in FIG. 19, when there are only users who are 12 years or younger, the image display apparatus 1700 permits the users to make a call to only callers identified with caller IDs "xxxx001" and "xxxx0002" and does not permit the users to make a call to other callers without displaying incoming call displays.

On the other hand, when there is a user who is 30 years or older, it is permitted to make a call to callers other than the caller identified with the caller ID to which the incoming call rejection setting is made (e.g., xxxx0002) because the transmission permissible setting is "any". When all of the users are 30 years or older, the users are not permitted to make a call to a caller identified with the caller ID "xxxx002" while when there is a user who is 12 years or younger together with the users 30 years or older, it is permitted to make a call to the caller identified with the caller ID "xxxx0002" because the caller ID "xxxx0002" is registered in the transmission permissible setting.

In this way, the image display apparatus 1700 according to the embodiment can carry out control in such a manner that a user under a predetermined age is restricted to make a call to a registered caller while it is permissible to make a call to other callers who are not registered if there is another user who is the predetermined age or older, for example. In addition, a setting to display an incoming call display or a setting not to display an incoming call display can be made according to the predetermined age.

In the second embodiment, users existing in a surrounding environment of the image display apparatus 1700 are identified with their ages based on image data taken by the camera 246. The user identification, however, is not limited to be carried out based on image data. Users may be identified based on external environmental information. For example, a user's age may be identified by using voiceprint data instead of image data. The identification method of voiceprint data is the same as that of the first modification of the first embodiment, and thus description thereof is omitted.

In the related art, when there is an incoming call made to an image processing apparatus that has a videophone function and is shared by a plurality of persons, any of the users can receive the call. Accordingly, a child receives a call from a specific or an unspecified caller when his or her parent is absent, for example. In contrast, the image display apparatus 1700 according to the second embodiment can carry out control in such a manner that it is permitted to make a call to a specific or an unspecified caller only when a specific recipient (e.g., a parent) exists in a surrounding area of a television, or that it is not permitted to make a call to a specific or an unspecified caller when a specific recipient (i.e., a child) exists in a surrounding area of a television, for example. As a result, safety is secured for a user (e.g., a child) using the videophone of the image display apparatus 1700.

The image display apparatuses according to the above-described embodiments and the modifications identify users existing in their surrounding environments or the user's ages based on environmental information such as voice data and image data, and carry out incoming call control according to the users or the user's ages. As a result, the image display apparatuses can improve convenience and maintain privacy.

In the embodiments and modifications, the image display apparatuses are provided with only any one of the person identifier and the age estimation module. The image display apparatus, however, is not limited to be provided with only any one of the person identifier and the age estimation module. Both of the person identifier and the age estimation module may be provided.

The IP telephone program executed by the image display apparatuses of the above-described embodiments and modifications is provided with a ROM, for example, as built-in software.

The image IP telephone program executed by the image display apparatuses of the above-described embodiments and modifications may be recorded into a storage medium readable by a computer with a format installable in or a file executable by the computer, and provided. The examples of the storage medium include a compact disc-read only memory (CD-ROM), a flexible disk (FD), a compact disc-recordable (CD-R), and a digital versatile disk (DVD).

The IP telephone program executed by the image display apparatuses of the above-described embodiments and modifications may be stored in a computer connected to a network such as the Internet, and be provided by downloading the programs through the network. The IP telephone program executed by the image display apparatuses of the above-described embodiments and modifications may be provided or delivered through a network such as the Internet.

The IP telephone program executed by the image display apparatuses of the above-described embodiments and modifications comprises the above-described modules: the image data encoder; the voice data encoder; the videophone data generator; the videophone data transmitter; the videophone data receiver; the videophone data separator; the image data decoder; the voice data decoder; the call function controller; the incoming call permission/rejection determiner; the person identifier; the age estimation module, the camera image decoder; and the microphone voice decoder. In the practical hardware, the CPU (processor) reads out the IP telephone program from the ROM and executes the program. Once the program is executed, the above-described modules are loaded in a main storage device, so that the image data encoder, the voice data encoder, the videophone data generator, the videophone data transmitter, the videophone data receiver, the videophone data separator, the image data decoder, the voice data decoder, the call function controller, the incoming call permission/rejection determiner, the person identifier, the age estimation module, the camera image decoder, and the microphone voice decoder are formed in the main storage device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display apparatus, comprising:
    a communications module configured to transmit and receive call information with a communications equipment connected to the image display apparatus through a network, the call information indicating information to communicate with the communications equipment;
    an acquisition module configured to acquire environmental information representing an external environment of the image display apparatus;
    an identification module configured to identify personal information indicating a person existing in the environment or age information indicating an age of a person existing in the environment from the environmental information; and
    a determination module configured to determine, when the communications module receives the call information from the communications equipment, whether to permit the communications module to transmit and receive the call information with respect to the communications equipment that transmits the call information based on the identified personal information or the identified age information, wherein
    when the determination module determines not to permit the communications module to transmit and receive the call information, the determination module further determines whether to display on a display module that the call information has been received, based on the identified personal information or the identified age information.

2. The image display apparatus of claim 1, wherein the identification module identifies a plurality of pieces of the personal information or a plurality of pieces of the age information, and
    the determination module determines whether to permit the communications module to transmit and receive the call information based on the identified pieces of personal information or the identified pieces of age information.

3. The image display apparatus of claim 1, further comprising a storage module configured to store therein the personal information or the age information in association with communications party identification information identifying a communications party with respect to which the call information is permitted or not permitted to be transmitted and received, wherein
    the determination module determines whether to permit the communications module to transmit and receive the call information based on the communications party identification information corresponding to the identified personal information or the identified age information in the storage module.

4. The image display apparatus of claim 1, wherein the environmental information acquired by the acquisition module is image information of an imaged external environment, voice information collected from the external environment, wireless equipment identification information indicating wireless communications equipment connected to the image display apparatus by wireless communications, wired equipment identification information indicating wired equipment connected to the image display apparatus with a wire, or security information used for identifying a person.

5. A communications control method executed by an image display apparatus, the method comprising:
    transmitting and receiving call information with a communications equipment connected to the image display apparatus through a network, the call information indicating information to communicate with the communications equipment;
    acquiring environmental information representing an external environment of the image display apparatus;
    identifying personal information indicating a person existing in the environment or age information indicating an age of a person existing in the environment from the environmental information; and
    determining, upon reception of the call information from the communications equipment at the transmitting and receiving, whether to permit transmitting and receiving the communications information with respect to the communications equipment that transmits the call information based on the identified personal information or the identified age information, wherein
    when the determining determines not to permit the transmitting and receiving of the call information, the determining further determines whether to display on a display module that the call information has been received, based on the identified personal information or the identified age information.

6. A communications control system, comprising:
    an image display apparatus; and
    an imaging apparatus comprising an imaging module configured to image an external environment and output the imaged external environment to the image display apparatus as image information, wherein
    the image display apparatus comprises:
    a communications module configured to transmit and receive call information with a communications equipment connected to the image display apparatus through a network, the call information indicating information to communicate with the communications equipment;
    an acquisition module configured to acquire the image information from the imaging apparatus;
    an identification module configured to identify personal information indicating a person existing in the environment or age information indicating an age of a person existing in the environment from the image information; and a determination module configured to determine, when the communications module receives the call information from the communications equipment, whether to permit the communications module to transmit or receive the call information with respect to the communications equipment that transmits the call information based on the identified personal information or the identified age information, wherein when the determination module determines not to permit the communications module to transmit and receive the call information, the determination module further determines whether to display on a display module that the call information has been received, based on the identified personal information or the identified age information.

\* \* \* \* \*